(12) United States Patent
Gupta et al.

(10) Patent No.: US 11,551,013 B1
(45) Date of Patent: Jan. 10, 2023

(54) AUTOMATED QUALITY ASSESSMENT OF TRANSLATIONS

(71) Applicant: Amazon Technologies, Inc., Seattle, WA (US)

(72) Inventors: Prabhakar Gupta, Delhi (IN); Anil Kumar Nelakanti, Bangalore (IN)

(73) Assignee: Amazon Technologies, Inc., Seatte, WA (US)

( * ) Notice: Subject to any disclaimer, the term of this patent is extended or adjusted under 35 U.S.C. 154(b) by 232 days.

(21) Appl. No.: 16/806,705

(22) Filed: Mar. 2, 2020

(51) Int. Cl.
*G06F 40/58* (2020.01)
*G06F 16/78* (2019.01)

(52) U.S. Cl.
CPC .......... *G06F 40/58* (2020.01); *G06F 16/7867* (2019.01)

(58) Field of Classification Search
CPC ... G06F 40/58; G06F 16/7867; G06N 3/0445; G06N 3/0454; G06N 3/08
See application file for complete search history.

(56) References Cited

U.S. PATENT DOCUMENTS

| | | | | |
|---|---|---|---|---|
| 7,130,790 | B1* | 10/2006 | Flanagan | G06F 40/58 348/468 |
| 8,848,109 | B2* | 9/2014 | Pornprasitsakul | G11B 27/031 348/588 |
| 9,959,271 | B1* | 5/2018 | Goyal | G06F 40/51 |
| 10,685,188 | B1* | 6/2020 | Zhang | G06F 40/263 |
| 10,878,201 | B1* | 12/2020 | Wuebker | G06F 40/45 |
| 2010/0198579 | A1* | 8/2010 | Cunnington | H04L 12/1822 704/3 |
| 2011/0178791 | A1* | 7/2011 | Stymne | G06F 40/44 704/2 |
| 2012/0265518 | A1* | 10/2012 | Lauder | G06F 40/51 704/3 |
| 2014/0067370 | A1* | 3/2014 | Brun | G06F 40/211 704/9 |
| 2014/0278346 | A1* | 9/2014 | Zomet | G06F 40/58 704/3 |
| 2017/0048340 | A1* | 2/2017 | Zhang | G06F 16/335 |
| 2017/0139904 | A1* | 5/2017 | Dakss | G06F 40/51 |
| 2017/0371867 | A1* | 12/2017 | Hughes | G06F 40/51 |
| 2018/0143975 | A1* | 5/2018 | Casal | G06F 40/51 |
| 2020/0042601 | A1* | 2/2020 | Doggett | G06F 40/58 |
| 2020/0175335 | A1* | 6/2020 | Li | G06N 20/00 |
| 2020/0184020 | A1* | 6/2020 | Hashimoto | G06N 3/088 |
| 2020/0192727 | A1* | 6/2020 | Savenkov | G06F 9/547 |
| 2020/0356634 | A1* | 11/2020 | Srinivasan | G06F 40/30 |
| 2020/0394271 | A1* | 12/2020 | Bihani | G06F 40/45 |
| 2021/0209313 | A1* | 7/2021 | Li | G06F 40/289 |

* cited by examiner

*Primary Examiner* — Akwasi M Sarpong
(74) *Attorney, Agent, or Firm* — Eversheds Sutherland (US) LLP

(57) ABSTRACT

Technologies are provided for automated quality assessment of translations. In some embodiments, quality of a translation can be assessed by generating a machine-learning (ML) model that classifies the translation as pertaining to one of three quality categories. A first quality category can include, for example, translations that are deemed satisfactory. A second quality category can include, for example, translations that are deemed subject to edition prior to being deemed satisfactory. A third quality category can include, for example, translations that are deemed unsatisfactory. The generated ML model can then be applied to the translation and a corresponding sentence in a source language in order to classify the translation as pertaining to one of the three categories.

16 Claims, 9 Drawing Sheets

AUTOMATED QUALITY ASSESSMENT OF TRANSLATIONS

BACKGROUND

Digital entertainment industry has grown multifold due in part to ease of Internet access and numerous options for on-demand streaming platforms. One way in which those providers increase their viewership is by enabling content in local languages. Translation of subtitles across languages is one of the cost-effective and preferred industry practices to maximize end-user reach. Subtitles are translated using bilingual (and sometimes multilingual) human translators. They watch the content and use a source subtitle in one language to translate it to another language. Low translation quality and high manpower cost, which can grow significantly with scarcity of target language resources, are some problems with bilingual human translators. Low translation quality can cause an increase in usage dropoff and hurt content viewership for audience of target language. Accordingly, translation quality assessment is relevant. Some commonplace assessment protocols can include a second translator validating an initial quality assessment.

Some existing technologies have attempted to automate the quality assessment of translations by relying on binary classification between acceptable and unacceptable translations, or scoring (or rating) to assign a score of translation acceptability. However, binary classification ignores "loosely" translated samples that can occur due to human factors, such as paraphrasing, under-translation, or over-translation. In some situations, a human translator rephrases sentences sometimes using contextual information not available in the source sentence. In turn, for automated scoring, gathering reliable human scored data sufficiently large to train a supervised system can be prohibitively expensive (if not plain unfeasible) and time-consuming. Human-scored data can rarely be made scalable to new languages.

Therefore, much remains to be improved in technologies that evaluate quality of a translation between natural languages.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1A:
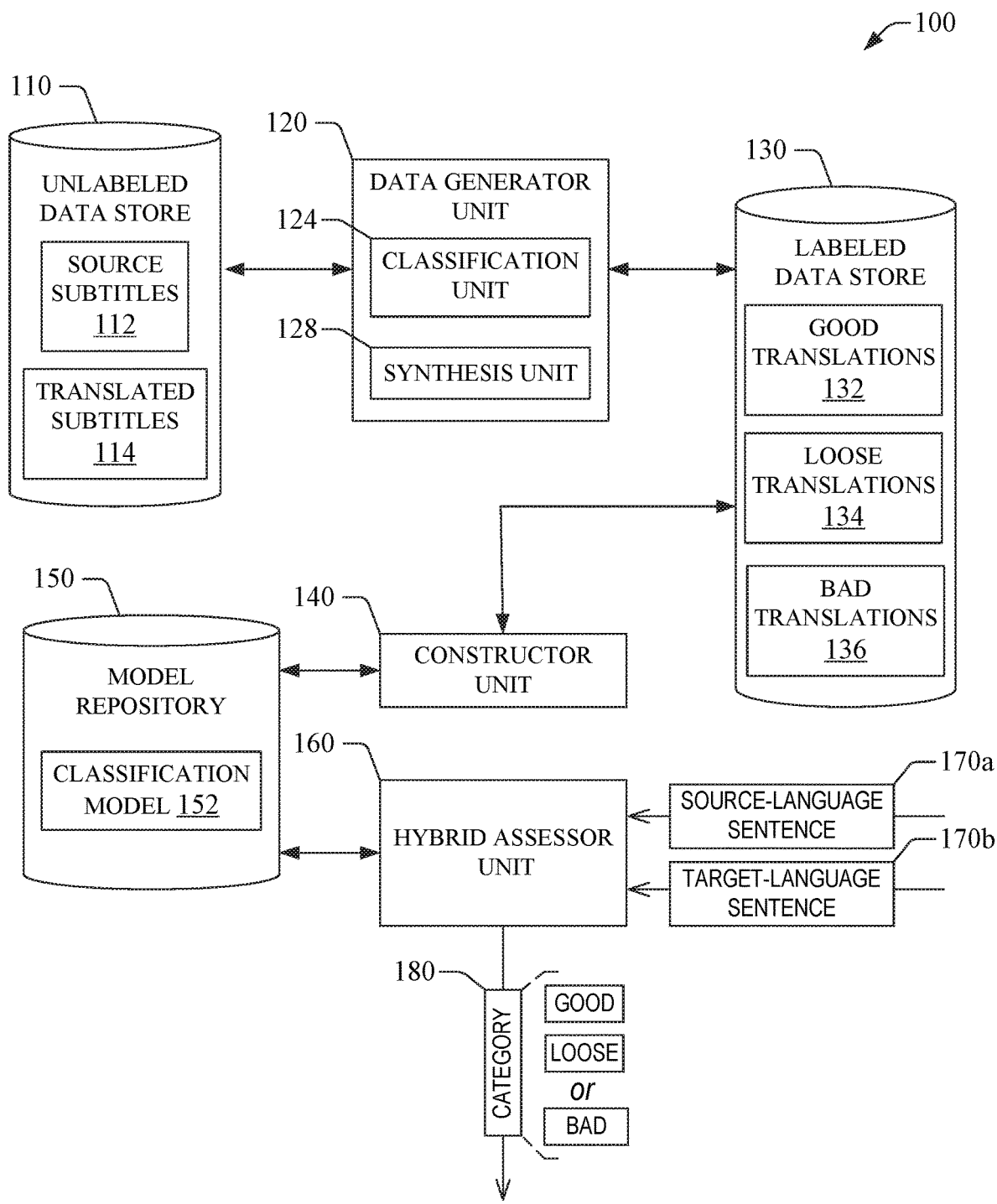
FIG. 1A illustrates an example of an operational environment for automated quality assessment of translations, in accordance with one or more embodiments of this disclosure.

The disclosure recognizes and addresses, amongst other technical challenges, the issue of quality assessment of translations from one natural language to another natural language. Embodiments of the technologies of this disclosure include systems for automated quality assessment of translations from a source natural language to a target natural language. In some embodiments, the source natural language is English and the target natural language is one several languages, including French, German, Italian, Portuguese and Spanish. Thus, various source-target language pairings are contemplated—English-French, English-German, English-Italian, English-Portuguese, and English-Spanish. The disclosed technologies also can be applied to source-target language pairings of non-Latin-rooted languages.

To overcome the problems with conventional technologies that rely on binary classification approaches, the technologies of this disclosure introduce a third category of translation: Loose Translation. Such a category permits introducing acceptable paraphrasing, for example, within the context of quality assessment of translations. Therefore, by incorporating the Loose Translation category the disclosed technologies extend the conventional categories utilized for translation assessment and, thus, provide greater assessment flexibility. Further, the incorporation of the Loose Translation category provides greater efficiency in the characterization of available translations, reducing in some instances the utilization of computational resources for the review of extant translations.

Quality of a translation can then be assessed by supervised training of a machine-learning (ML) model to classify translations as pertaining to one of Good Translation, Loose Translation, or Bad Translation categories. The generated machine-learning model can then be applied to the translation and a corresponding sentence in a source language in order to classify the translation as pertaining to one of those three categories. Another machine-learning model also can be trained to generate a score representing a quality of the translation. Both of the machine-learning models are a first bidirectional long short-term memory (LSTM) monolingual encoder, a second bidirectional (LSTM) monolingual encoder, and a convolutional neural network that determines the category using concatenated output from the first bidirectional LSTM encoder and the second first bidirectional LSTM encoder. The models can thus be referred to as hybrid assessor models.

Embodiments of the disclosed technologies can reduce both cost and time in subtitle translation from a source natural language to a target natural language while assuring quality of the translation. More specifically, embodiments of the disclosed technologies can outperform non-hybrid assessor models by about 3%.

The disclosed technologies are not limited to assessing translations of subtitles. Indeed, the principles of the practical applications of the technologies disclosed herein can be applied to other types of text fragments. In addition, some embodiments of the disclosed technologies utilize subtitle block level translations to make a decision, without incorporating temporal structure. Temporal structure may provide significant information to improve a quality assessment, particularly on Loose translations. Further, training one hybrid assessor model per language pairing can incur substantial operational load. In some situations, a multilingual model can reduce this load while helping resource starved languages. Leveraging temporal information and learning a common space for multiple languages also can permit simplifying the application of the disclosed technologies to non-Latin rooted natural languages (Farsi, Chinese, etc.)

With reference to the drawings, FIG. 1A illustrates an example of an operational environment 100 for automated quality assessment of translations, in accordance with one or more embodiments of this disclosure. The operational environment 100 includes an unlabeled data store 110 that can include data defining video subtitles in a source natural language. Such data can be retained in one or multiple data structures 112 (referred to as source subtitles 112). The unlabeled data store 110 also can include other data defining translations of the video subtitles to a target natural language. Such other data can be retained in one or multiple data structures 114 (referred to as translated subtitles. As mentioned, in some embodiments, the source natural language is English and the target natural language is one of several other languages, including French, German, Italian, Portuguese and Spanish. Thus, various source-target language pairings are contemplated—English-French, English-German, English-Italian, English-Portuguese, and English-Spanish.

Given a subtitle file in a source language A and a translation of the subtitle file in a target language B, the quality of the translation can be determined on individual pairs of text blocks $A_i$, $B_i$ that are matched by timestamps. Here, "i" is an integer index that permits identification of a text block. Specifically, the quality of the translation can be assessed by classifying the translation into one of three categories such that $\hat{y} \leftarrow f(A_i, B_i)$ where $\hat{y} \in \{GOOD, BAD, LOOSE\}$. Those categories include: Good Translation; Loose Translation; and Bad Translation. The Good Translation category can include perfect or near-perfect translations. Here, "perfect" refers to proper grammar and syntax as in the target language B. The Good Translation category can be labeled, and also referred to, as Good. The Loose Translation category can include paraphrased translations or translations that are not completely unacceptable. Such translations may require a post-edit in order to render those translations satisfactory for consumption by a service device (e.g., a device within a video streaming platform). The Bad Translation category can include incorrect translations that may or may not be correct as individual source and target sentences, but fail to form a proper translation language pairing.

Gathering human labeled data sufficient to train a supervised system is expensive, time-consuming, and not reliable at times. Therefore, the operational environment 100 includes a data generator unit 120 that can label data and, in some instances, can generate synthetic data based on unlabeled subtitle data. The data generator unit 120 can process large amounts of unlabeled data, yielding labeled data suitable for supervised training. The data generator unit 120 can generate the labeled data computationally efficiently, affordably, and reliably.

The data generation unit 120 can operate on the source subtitles 112 and the translated subtitles 114 to generate labeled data. To that end, in some embodiments, the data generator unit 120 can access a dataset of about 30,000 video subtitles with their respective unlabeled translations. The data generator unit 120 can map each source subtitle block to its corresponding translation using timestamp information in the subtitles. The data generator unit 120 also can include a classification unit 124 that can train one or many binary classifiers to label approximately 69.2% of these translations to one of the three categories defined herein: Good, Bad, and Loose.

The classification unit 120 can rely on statistical classification, training two binary classifiers to label a dataset. One of the two binary classifiers is a Bag-of-Words (BOW) model, and the other one is a Random Forest Classifier (RFC). These classifiers are discussed in greater detail below. After the classification unit 124 has applied the statistical classification described above, Eq. (1) can define the label ($\hat{y}$) assignment using classifier scores, where $s_{BOW}$ is the classifier score from BOW model and $s_{RFC}$ is the probability predicted from RFC.

$$\hat{y} = \begin{cases} BAD & s_{BOW} \leq 0.25, s_{RFC} \leq 0.25 \\ LOOSE & s_{RFC} \leq 0.70, s_{RFC} \geq 0.30 \\ GOOD & s_{BOW} \geq 0.80, s_{RFC} \geq 0.80 \end{cases} \quad (1)$$

The labeled dataset resulting from statistical classification may not be enough to train a classifier on its own—French, for example, can have about 800,000 training samples from statistical classification across those three categories. The labeled dataset, however, can be augmented with synthetic data in some embodiments. It is noted that commonplace data synthesis methods have been simple, often not representing patterns in real-world translations.

Accordingly, the data generator unit 120 can include a synthesis unit 128 that can implement different approaches to synthesize data for each one of the foregoing three categories. Specifically, the synthesis unit 128 generate Good translations by using Neural Machine Translation (NMT) systems. It is noted that NMT can outperform human translators for shorter sentences. The synthesis unit 128 can generate Loose translations by analyzing subtitles and applying specific synthesis rules described below. The synthesis unit 128 can generate Bad translations by introducing errors in correct translations.

Table 1 illustrates the distribution of labeled dataset from different data sources, for several natural languages. Datasets were shuffled in order to lose any unwanted contextual information across subtitles. As is shown in the Statistical Classification column of Table 1, about 17% of the data in the labeled dataset has been classified using multiple classifiers technique.

TABLE 1

Data distribution (in percentage points) from different sources for several natural languages.

|  | Statistical Classification | NMT | Added Captions | Scrambled Text | Drifted Aligned | Randomly Aligned |
| --- | --- | --- | --- | --- | --- | --- |
| French | 18.83 | 33.76 | 6.58 | 6.58 | 17.13 | 17.13 |
| German | 17.26 | 32.14 | 7.07 | 7.07 | 18.23 | 18.73 |
| Italian | 16.44 | 32.95 | 6.57 | 6.57 | 18.74 | 18.74 |
| Portuguese | 16.47 | 33.09 | 6.59 | 6.59 | 18.63 | 18.63 |
| Spanish | 17.82 | 29.15 | 7.01 | 7.01 | 19.50 | 19.50 |

Table 2 illustrates dataset label distribution for a labeled dataset that was divided into train-validation-test datasets.

TABLE 2

Dataset label distribution (in percentage points) for labeled datasets for respective example natural languages.

|  | Bad | Good | Loose |
| --- | --- | --- | --- |
| French | 39.50 | 34.17 | 26.33 |
| German | 38.65 | 33.06 | 28.29 |
| Italian | 39.40 | 34.33 | 26.27 |
| Portuguese | 39.54 | 34.10 | 26.36 |
| Spanish | 42.05 | 29.92 | 28.03 |

$$s_{source} = \frac{1}{N}\sum_{i=1}^{N}\max_{j\in[M]}\mathbb{1}(A_{ij}) \tag{2}$$

$$s_{target} = \frac{1}{M}\sum_{j=1}^{M}\max_{i\in[N]}\mathbb{1}(A_{ij}) \tag{3}$$

$$s_{BOW} = \min(s_{source}, s_{target}) \tag{4}$$

$$y_{pred} = s_{BOW} > \Theta_2$$

$$\mathbb{1}(A_{ij}) = \begin{cases} 1 & \text{if } A_{ij} > \Theta_1 \\ 0 & \text{otherwise} \end{cases}.$$

The quantity $y_{pred}$ can be used to evaluate the performance of the BOW model, and $s_{BOW}$ can be used for the data labelling task in accordance with Eq. (5) below. In some configurations, the synthesis unit 128 can generate a dataset of approximately $10^6$ Good translations and approximately $10^6$ Bad translations, as is described in greater details below, for each one of several target languages. The data generator unit 120 can allocate portions of the generated dataset to training, validation, and testing. In one configuration, the data generator can apply a 70-20-10 training validation, testing split of the dataset, thus allocating 70% of the dataset to a training dataset, 20% of the dataset to a validation dataset, and 10% to a testing dataset. The validation dataset can be used to find best values of $\Theta_1$ and $\Theta_2$. Table 3 presents performance results for the BOW model in accordance with aspects of this disclosure.

TABLE 3

Performance for Bag-of-Words model and Random Forest Classifier on their respective test datasets (different from the one used in Table 4). In this table, A, P, R and F denote Accuracy, Precision, Recall and F-Score, respectively.

|  |  |  | Bag-of-Words Model | | | | Random Forest Classifier | | | |
| --- | --- | --- | --- | --- | --- | --- | --- | --- | --- | --- |
|  | $\Theta_1$ | $\Theta_2$ | A | P | R | F | A | P | R | F |
| French | 0.6 | 0.30 | 90.72 | 92.37 | 88.76 | 90.53 | 92.86 | 94.72 | 89.26 | 91.91 |
| German | 0.6 | 0.35 | 90.51 | 90.02 | 91.13 | 90.57 | 92.16 | 94.01 | 88.34 | 91.09 |
| Italian | 0.5 | 0.40 | 88.71 | 88.56 | 88.91 | 88.73 | 92.31 | 94.40 | 88.41 | 91.31 |
| Portuguese | 0.6 | 0.30 | 91.89 | 91.86 | 91.91 | 91.89 | 92.88 | 94.77 | 89.27 | 91.94 |
| Spanish | 0.6 | 0.30 | 90.22 | 91.90 | 88.21 | 90.02 | 92.90 | 94.71 | 89.37 | 91.96 |

The BOW model can determine the fraction of words correctly translated from source language to target language using aligned word embeddings. A cosine similarity matrix (N×M) can be generated for a source sentence with N words and a target sentence with M words. Each matrix element $A_{ij}$ represents the normalized cosine distance between source word and target word. We calculated Using the cosine similarity matrix, a source score $s_{source}$ and a target score $s_{target}$ can be calculated according to Eq. (2) and Eq. (3), respectively. The source score and the target score can be used to determine $s_{BOW}$, and the final BOW label $y_{pred}$ can be generated based on $s_{BOW}$ as is defined in Equation (4). Here, two hyperparameters: $\Theta_1$ and $\Theta_2$ are defined, with values between 0 and 1.

Random Forest Classifier (RFC) can be trained using linguistic features and statistical features. The linguistic features that can be used for training include, for example, bilingual n-gram similarities, source n-gram probabilities, target n-gram probabilities, a combination thereof, or similar. The statistical features that can be used for training include, for example, word count or average character count, or both. In one configuration, EuroParl dataset available in OPUS format can be utilized for correct translations. Correct translations can be modified by introducing errors (such as incorrect word substitution and random sentence alignment) in order to generate incorrect translations. In some embodiments, the synthesis unit 120 can generate a dataset of approximately 5×10⁶ samples for each one of several target languages (French, German, Italian, Portuguese, Spanish, etc.). Again, a validation dataset can be utilized to perform hyperparameter optimization for a particular language. The validation dataset can be a subset of the generated dataset for the particular language. Table 3 presents performance results for the RFC.

The synthesis unit 128 can generate translations for each one of the Good Translation, Loose Translation, and Bad Translation categories can be generated in numerous ways. As an illustration, because subtitles are small in length, translations for the Good Translation category can be generated using an NMT engine. The NMT can be trained accordingly to conventional techniques. Specifically, the synthesis unit 128 can apply a trained machine-learning model corresponding to the NMT engine to a subtitle, resulting in a translation of the subtitle and a corresponding source-target language pairing. In some embodiments, the majority of the Good Translation dataset is generated using NMT to avoid noise from statistical classifiers. The synthesis unit 128 can retain data defining the synthetic Good Translation dataset in one or several data structures 132 (referred to as good translations 132) in a labeled data store 132.

As another illustration, the synthesis unit 128 can generate translations for the Loose Translation category by modifying good translations. A Good translation can be modified by introducing errors into the corresponding source-target language pairing in a manner that renders the Good translation unacceptable. In one example, the synthesis unit 128 can introduce subtitle-captions (such as "whispers," "laughs loudly," and the like) into the source language sentence and not into the target language sentence. In this disclosure, such a modification can be referred to as "Added Captions." In another example, the synthesis unit 128 can modify the order of the words in one of the source-language sentences or the target-language sentence such that the source-target language pairing corresponding to a translation has all the translated words but fluency is missing. In this disclosure, such a modification can be referred to as "Scrambled Text." The synthesis unit 128 can retain data defining the synthetic Loose Translation dataset in one or several data structures 134 (referred to as loose translations 134) in the labeled data store 132.

As yet another illustration, the synthesis unit 128 can generate one type of translations for the Bad Translation category by randomly mapping a list of source and target sentences in order to generate hard negatives. In this disclosure, that type of translation can be referred to as "Randomly Aligned." The synthesis unit 128 also can generate another type of translation for such a category by shifting existing subtitle files with an offset of 1 to 2 subtitle blocks, for example, in order to create soft negatives. In this disclosure, a second type of translations can be referred to as "Drifted Aligned." A soft negative can retain some of scene context but are incorrect as a translation. The synthesis unit 128 can retain data defining the synthetic Bad Translation dataset in one or several data structures 136 (referred to as bad translations 136) in the labeled data store 132.

The operational environment 100 also includes a constructor unit 140 that can generate a machine-learning model that can classify a translation of a video subtitle from the source language to the target language. In addition, or in other embodiments, the constructor unit 140 also can generate another machine learning model that can generate a score representing a quality of such a translation.

The constructor unit 140 can generate both of those machine learning models by minimizing a defined loss function for a hybrid assessor model. The hybrid assessor model defines a hybrid network that includes a first monolingual encoder and a second monolingual language encoder, and a classification network. Each of those encoders can learn semantic features of its respective language (either source or target language). The classification network can learn syntactic features of the translations. In some embodiments, the first monolingual encoder and the second monolingual encoder correspond to respective bidirectional LSTM (Bi-LSTM) networks. In addition, the classification network corresponds to a convolutional neural network (CNN).

The loss function that is minimized is specific to the type of quality assessment being implemented, e.g., classification or scoring. Regardless of the specific loss function, the constructor unit 140 can utilize an Adam optimizer with a batch size of 8192 in some configurations. Simply for the purposes of illustration, it is noted that the Adam optimizer include a first-order gradient-based technique for the optimization of stochastic objective functions. Other techniques for optimization of a loss function (or objective function) also can be implemented in the disclosed technologies. Other batch sizes also can be implemented. The constructor unit 140 also can utilize a learning rate of $10^{-3}$ scheduled to drop by a factor of 10 twice whenever the rate of training loss drop was less than $10^{-3}$ before terminating training. Table 4 presents the size of the dataset used for training and testing.

TABLE 4

Train and Test Performance for a hybrid quality assessor model in accordance with this disclosure.

| | Train | | Test | | | | |
|---|---|---|---|---|---|---|---|
| | # Samples | Accuracy | # Samples | Accuracy | Precision | Recall | F-Score |
| French | $4.23 \times 10^6$ | 93.91 | $0.83 \times 10^6$ | 91.49 | 91.04 | 90.42 | 90.63 |
| German | $12.97 \times 10^6$ | 95.18 | $2.53 \times 10^6$ | 93.90 | 93.68 | 93.29 | 93.42 |
| Italian | $3.74 \times 10^6$ | 94.41 | $0.73 \times 10^6$ | 92.12 | 91.64 | 91.00 | 91.24 |
| Portuguese | $15.43 \times 10^6$ | 94.20 | $3.03 \times 10^6$ | 97.73 | 92.50 | 91.59 | 91.89 |
| Spanish | $18.24 \times 10^6$ | 93.14 | $3.58 \times 10^6$ | 91.45 | 90.90 | 90.39 | 90.42 |

Figure 1B:
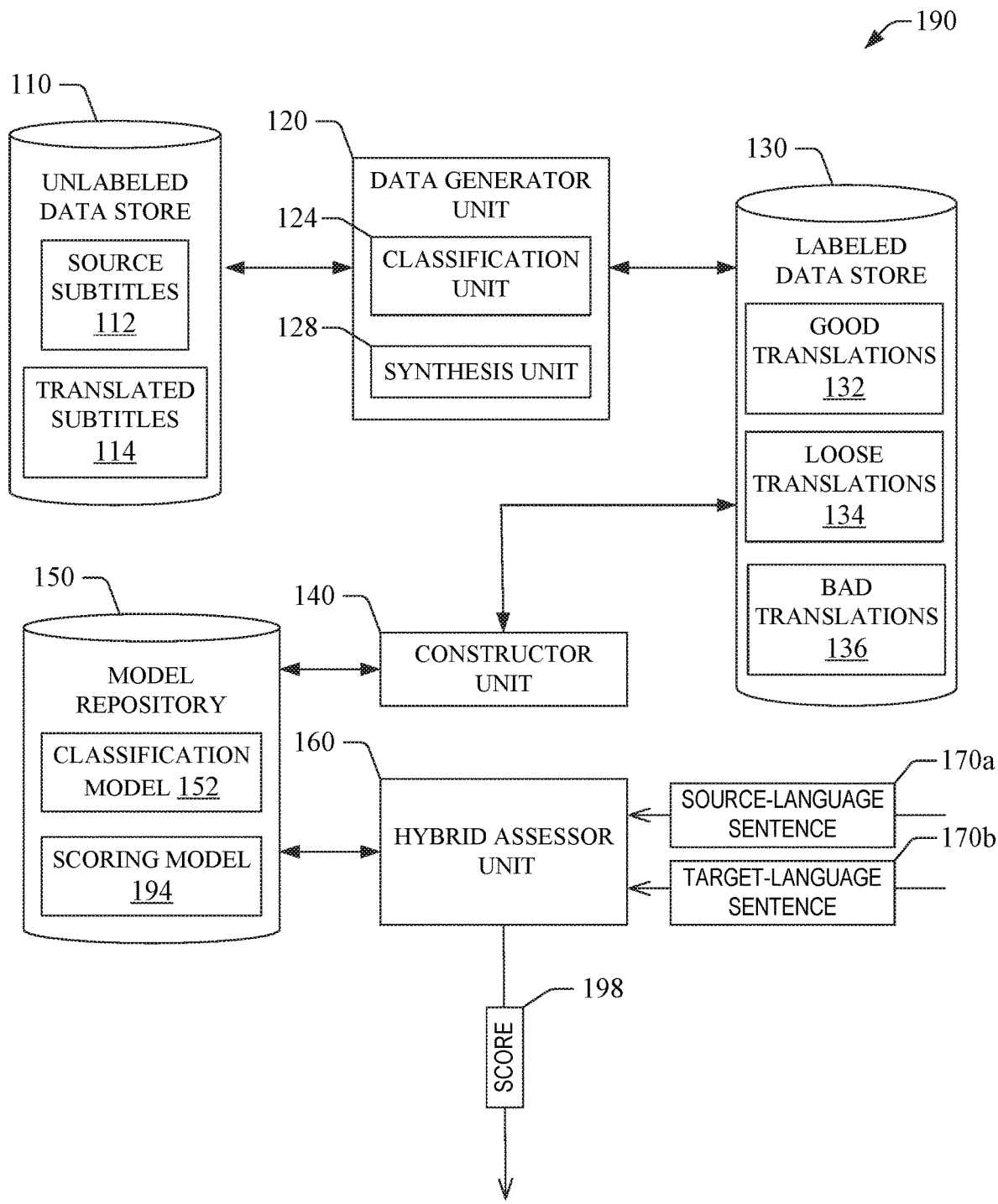
FIG. 1B illustrates another example of an operational environment for automated quality assessment of translations, in accordance with one or more embodiments of this disclosure.

Solving such a minimization problem results in a first set of parameters defining the first monolingual encoder; a second set of parameters defining the second monolingual encoder, and a third set of parameters defining the classification network (e.g., a CNN). Those parameters define a trained hybrid assessor model that can provide a translation quality assessment. In some embodiments, the translation quality assessment can be provided by classifying a translation as one of Bad, Loose, or Bad translation. In addition, or in other embodiments, the translation quality assessment can be provided by generating a score indicative of a quality of the translation. The score can be bound within a defined range, e.g., [0,1]. The constructor unit 140 can retain parameters defining a trained model in a model repository 150. A trained hybrid assessor model trained for classification can be retained in one or more data structures 152 (referred to as classification model 152). A trained hybrid assessor model trained for scoring can be retained in one or more data structures 194 (referred to as scoring model 194), as is illustrated in the operational environment 190 shown in FIG. 1B. As is also shown in FIG. 1B, after being individually trained, the classification model 152 and the scoring model 194 can be retained in the model repository 150.

A trained hybrid assessor model (trained for either classification or scoring) can be utilized for automated quality assessment of translations. To that end, the operational environment 100 (FIG. 1A) or the operational environment (FIG. 1B) can include a hybrid assessor unit 160 having an assessor network that has the same structure as the network defined by the trained hybrid assessor model. The hybrid assessor unit 160 configures the assessor network according to the trained hybrid assessor model. The hybrid assessor unit 160 receives first string data defining a source-language sentence 170a (e.g., a video subtitle) and also receives second string data defining a target-language sentence 170b and generates a quality assessment of the translation from the source-language sentence 170a to the target-language sentence 170b.

Figure 2A:
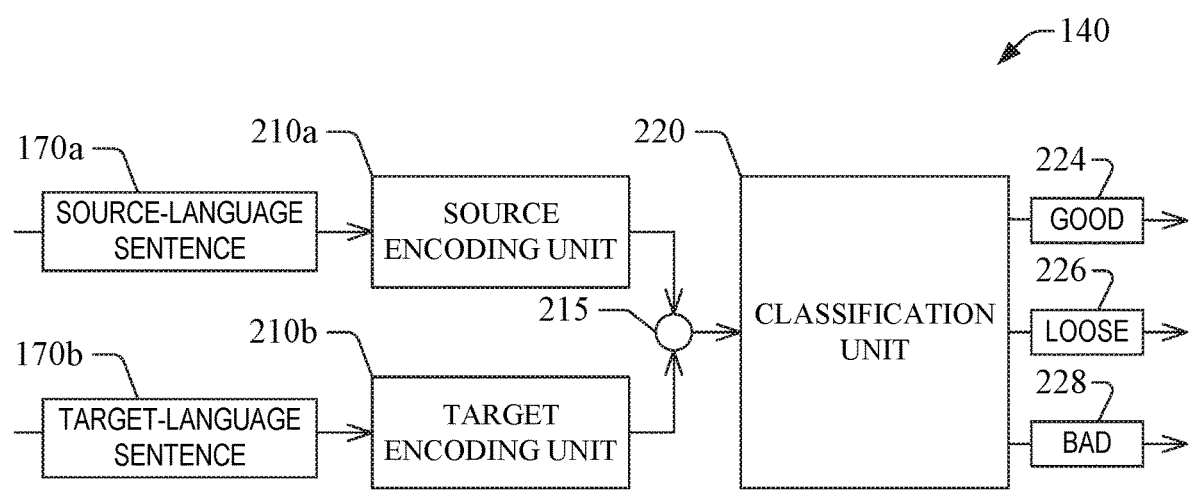
FIG. 2A illustrates an example of a quality assessment unit, in accordance with one or more embodiments of this disclosure.

As is illustrated in FIG. 2A, the hybrid assessor unit 160 can include a source encoding unit 210a that receives the source-language sentence 170a. The source encoding unit 210a can correspond to the trained first monolingual encoder that is included in the trained hybrid assessor model. In addition, the hybrid assessor unit 160 also can include a target encoding unit 210b that receives the target-language sentence 170b. The target encoding unit 210b can correspond to the trained second monolingual encoder that is included in the trained hybrid assessor model. In some configurations, the length of each sentence does not exceed 25 tokens, and each word in the sentence is formatted in lower-case and includes punctuation and numbers. In addition, 300-dimensional FastText embedding, can be utilized for each token. The technologies of this disclosure are not limited to that type of embeddings and, in some configurations other M-dimensional embeddings can be utilized for each token. Here, M is a natural language (e.g., 100, 200, 250, 300, or similar). The hybrid assessor unit 160 further includes a concatenator component 215 that concatenates output from the source encoding unit 210a and the target encoding unit 210b, and a classification unit 220 that receives such a concatenated output.

The hybrid assessor unit 160 can obtain the trained hybrid assessor model (trained for either classification or scoring) from the model repository 150 and can configure the source encoding unit 210a, the target encoding unit 210b, and the classification unit 220 for quality assessment. In an instance in which the trained hybrid assessor model is trained for classification, the hybrid assessor unit 160 can then determine a category 180 of a translation, as is shown in FIG. 1A. The category 180 is one of Good, Loose, or Bad. In an instant in which the trained hybrid assessor model is trained for scoring, the hybrid assessor unit 160 can then determine a score 198 for the translation, as is shown in FIG. 1B.

Figure 2B:
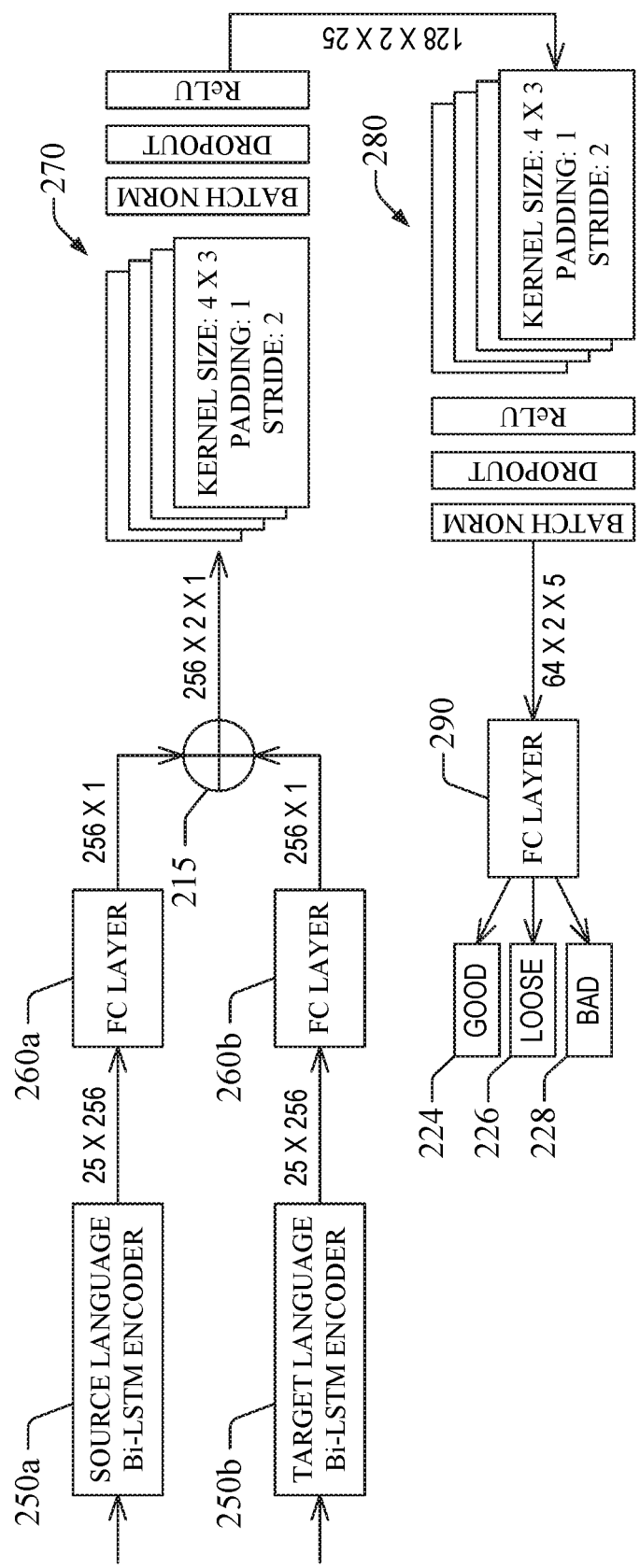
FIG. 2B illustrates an example of an architecture of a quality assessment unit, in accordance with one or more embodiments of this disclosure.

To perform a quality assessment of a translation of text from a source language to a target language, in some embodiments, as is shown in FIG. 2B, the source encoding unit 210a includes a source-language Bi-LSTM encoder 250a and a fully connected (FC) layer 260a. The source-language Bi-LSTM encoder 250a can receive the source-language sentence 170a or a representation thereof. The target encoding unit 210b includes a target language Bi-LSTM encoder 250b and an FC layer 260b. The source-language Bi-LSTM encoder 250a can receive the target-language sentence 170b or a representation thereof. Outputs of both Bi-LSTM encoders can be concatenated and sequentially sent to the two convolution modules. Thus, the concatenator component 215 can concatenate the output of the FC layer 260a and the output of the FC layer 260b. The concatenator component 215 can then send the concatenated output sequentially.

As is also shown in FIG. 2B, the classification unit 220 can include a first convolution module 270 and a second convolution module 280. The first convolution module 270 can receive the concatenated output from the concatenator component. Resulting output from the first convolution module 270 can be sent to the second convolution module 280. The classification unit 220 also includes an FC layer 290 that can receive the resulting output from the second convolution module 280.

The particular structure of data utilized by the elements of the hybrid assessor unit 160 illustrated in FIG. 2B is represented by various products of numbers. The particular structure of the convolution modules 270 and 280 (FIG. 2B) are indicated in the blocks that schematically depict the convolution unit 220. All of those particular structures are simply illustrative, and the technologies of this disclosure are not limited in that respect.

In a classification approach, output of the hybrid assessor unit 160 (FIG. 1A) can be generated using the FC layer 290 according to the output received from the second convolution module 280. The FC layer 290 can generate one of three outputs: a first output 224 for the Good category, a second output 226 for the Loose category, and a third output 228 for the Bad.

Figure 3:
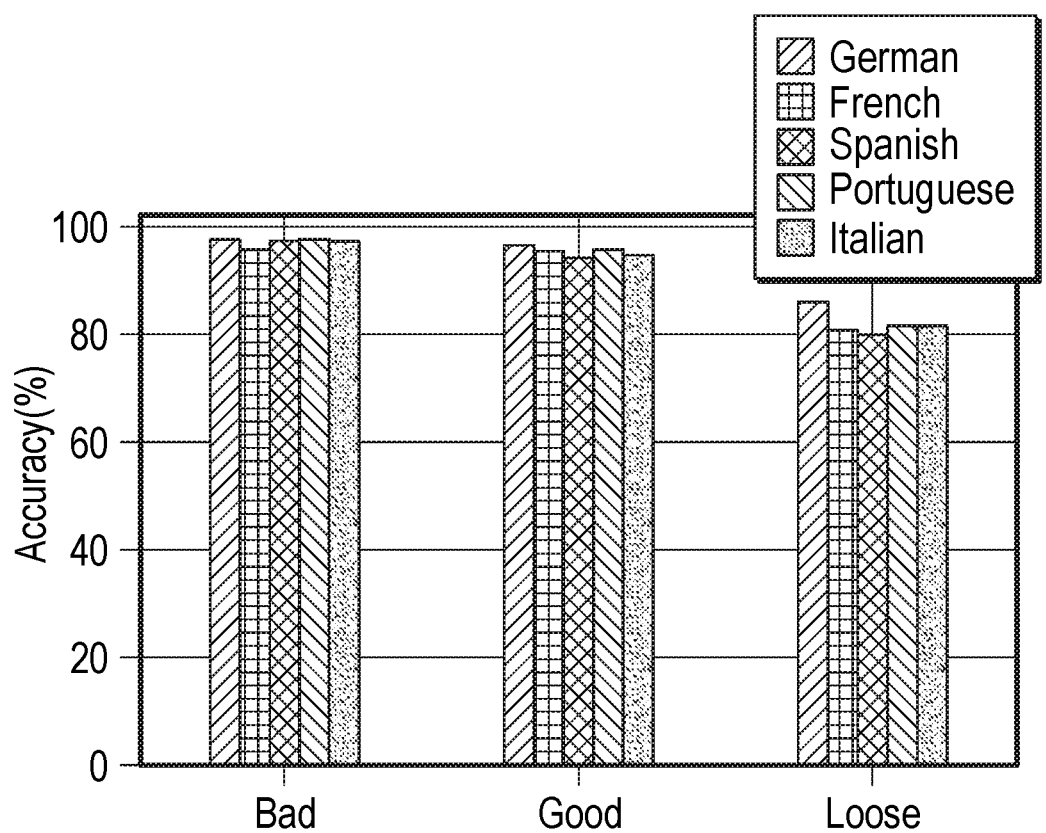
FIG. 3 illustrates accuracy of an example machine-learning model on a quality label for a translation, in accordance with one or more embodiments of this disclosure. The quality label can be one of Bad, Good, or Loose.
Figure 4:
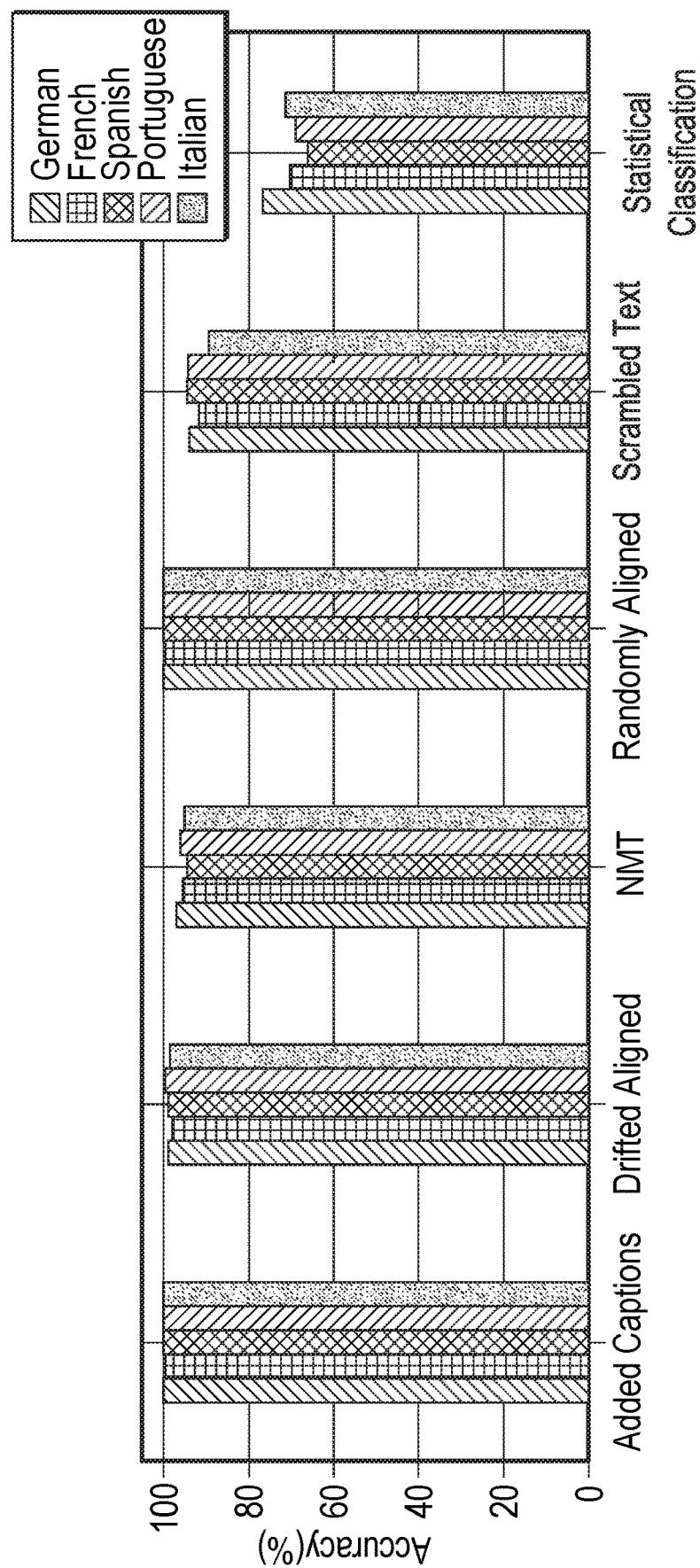
FIG. 4 illustrates performance of an example of a machine-learning model for each data source utilized in training of the model, in accordance with one or more embodiments of this disclosure.

Table 4 presents a comparison across various performance metrics for a hybrid quality assessor model in accordance with this disclosure. It can be observed that the hybrid quality assessor model in accordance with aspects of this disclosure performs similarly and accuracy exceeds 91% for the five target languages considered. FIG. 3 illustrates the accuracy of the model on each label (Bad, Good, and Loose). It can be observed from FIG. 3 that the accuracy of the model is lowest on Loose Translation. Without intending to be bound by theory and/or modeling, such a feature of the model accuracy can be due to 50% of loose translations being originated from statistical classification. FIG. 4 illustrates performance of a hybrid quality assessor model for each labeled data source. The performance is quantified in percentage points. It can be observed in FIG. 4 that the performance of statistical classification is the lowest. Analysis of samples reveals that label noise from statistical classification is present. The model, however, classifies the samples correctly.

Further, high-quality subtitles were obtained and a list of parallel sentences were extracted using timestamp information in the subtitles. The high-quality subtitles had been subjected to multiple iterations of human validation. Thus, translations corresponding to the high-quality subtitles can be reasonably assumed to be non-Bad translations. False Negative Rate (FNR) can be utilized as a performance metric for this experiment because the data was generated using curation; we assumed that such high-quality translation must pertain to either one of the Loose Translation or Good Translation categories. Table 5 presents the size of parallel sentences and results for each language. The FNR is low for each language. From this experiment, a maximum FNR of about 14% is observed, and, hence, it can be concluded that the model has a very high performance on non-Bad translations. Manual analysis reveals that for most of the cases where the model predicted a Bad translation, translations were actually incorrect and had to be fixed. For example, in translations from English to German, the phrase "Jesus" was translated to "Meine Güte." which literally translates to "My Goodness." Contextually, it can be understood why the phrase "Jesus" has been translated in this way, but the model should be flagging this as a Bad translation.

TABLE 5

Human Validation Experiment results.

| | # sentences | FNR |
|---|---|---|
| French | 2400 | 13.69 |
| German | 9,900 | 13.94 |
| Italian | 2,400 | 10.72 |
| Portuguese | 21,300 | 12.30 |
| Spanish | 25,200 | 12.31 |

As is disclosed herein, some embodiments of the disclosed technologies rely on classification and use cross entropy loss in hybrid assessor models in some configurations. Quality assessment of translations, however, also can be cast as a scoring problem. Accordingly, the classification approach disclosed herein can be transformed into a scoring approach. To that end, the cross-entropy loss function can be replaced by a loss function l suitable for a scoring approach. In some embodiments, the loss function l utilized in the scoring problem is defined in the following equation (Eq. (5)):

$$l = \min(0, \hat{y} - \Theta_y)^2 + \max(0, \hat{y} - \Theta_y')^2, \quad (5)$$

where $\hat{y}$ is a predicted score, y is a label, $\Theta_y$ and $\Theta_y'$ are, respectively, a lower bound threshold and an upper bound threshold for y. The values of $\Theta_y$ and $\Theta_y'$ for each label are defined in the following equation (Eq. (6)):

$$\Theta_y, \Theta_y' = \begin{cases} 0, 0.35 & y = \text{BAD} \\ 0.35, 0.65 & y = \text{LOOSE} \\ 0.65, 1 & Y = \text{GOOD} \end{cases} \quad (6)$$

Without intending to be bound by theory, the hyperparameters in Eq. (6) can assist a hybrid assessor model in learning that the decision boundary between a Good and a Loose translation is very different from the decision boundary between a Good translation and a Bad translation. In one aspect, again without intending to be bound by theory and/or modeling, the loss function l (Eq. (5)) permits defining hard boundaries for each category. Specifically, score in range [0; 0:35) for Bad, [0:35; 0:65) for Loose and [0:65; 1] for Good:

The final fully-connected layer of an architecture for the hybrid quality assessment unit 140 (see FIG. 1A and FIG. 2B, for example) can be changed to supply a single output followed by a sigmoid to bound a score in the range [0; 1]. Table 6 present the test accuracy of both classification loss (e.g., cross entropy loss) and scoring loss (l loss). It can be observed from Table 6 that the classification loss outperforms the scoring loss by approximately 4% for each one of the considered target languages. Without intending to be bound by theory and/or modeling, one reason for such performance difference can be that the classification loss can learn the difference between Good-Loose and Good-Bad.

TABLE 6

Accuracy comparison of classification and scoring losses by way of comparing classification results and scoring results.

| | Classification | Scoring |
|---|---|---|
| French | 91.49 | 87.46 |
| German | 93.90 | 90.81 |
| Italian | 92.12 | 88.61 |
| Portuguese | 92.73 | 88.46 |
| Spanish | 91.45 | 87.25 |

Existing convolutional neural networks that try to classify bilingual datasets may not able to learn the linguistic nuances of text and fail in many cases. However, recurrent neural networks (RNNs) can understand linguistic nuances, and RNNs may not be suitable for a classification tasks.

Performance of a hybrid neural network in accordance with aspects of this disclosure can be compared to an LSTM network and a CNN model. For LSTM network, the output of both Bi-LSTMs can be concatenated and sent to a fully connected (FC) layer. For the CNN model, three convolution modules are followed by a fully connected layer. In some configurations, the same training environment described above is utilized in both the LSTM network and the CNN model. For Baseline model, Eq. (1) is utilized to generate labels for test data. As is shown in Table 7, the hybrid neural network of this disclosure outperforms Baseline and both LSTM network and CNN network by approximately 3%.

TABLE 7

Test Accuracy for various model architectures.

| | Baseline | Hybrid Assessor | LSTM | CNN |
|---|---|---|---|---|
| French | 68.20 | 91.49 | 67.25 | 88.75 |
| Gemaan | 70.46 | 93.90 | 68.63 | 90.88 |
| Italian | 66.96 | 92.12 | 66.80 | 89.63 |
| Portuguese | 68.40 | 92.73 | 70.89 | 89.93 |
| Spanish | 70.73 | 91.45 | 68.86 | 88.50 |

Figure 5:
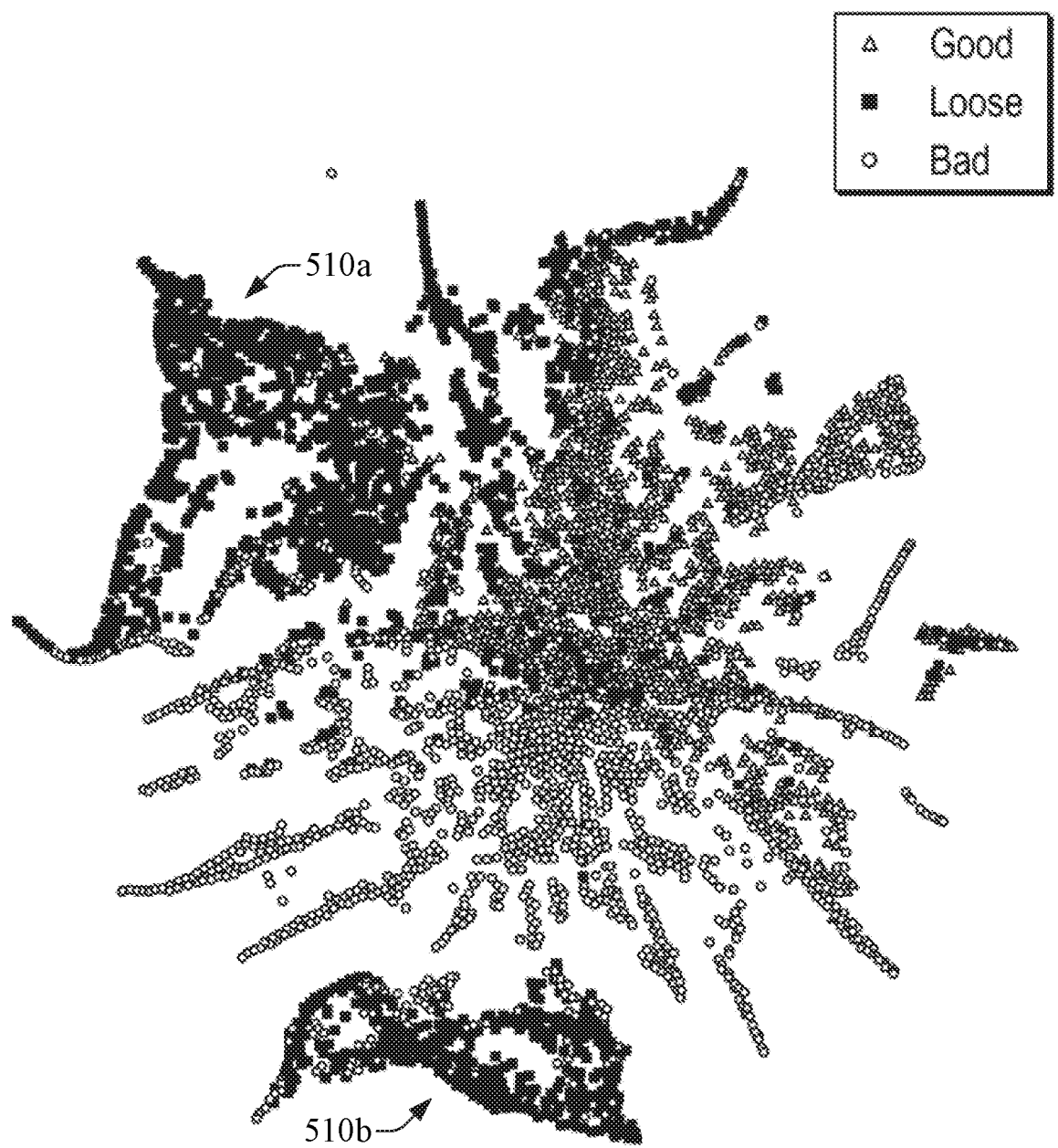
FIG. 5 illustrates a t-distributed stochastic neighbor embedding (t-SNE) visualization of the last layer of an example hybrid neural network, in accordance with one or more embodiments of this disclosure.

FIG. 5 illustrates a t-SNE visualization of the last layer of our hybrid network for the English-German pairing. The visualization conveys that there is a cluster for Good translations and another cluster for Bad translations. The visualization also conveys that there are a first cluster 510a and a second cluster 510b for Loose translations. Without intending to be bound by theory and/or simulation, such two clusters can be present because Loose translations can be close to both Good and Bad translations.

Figure 6:
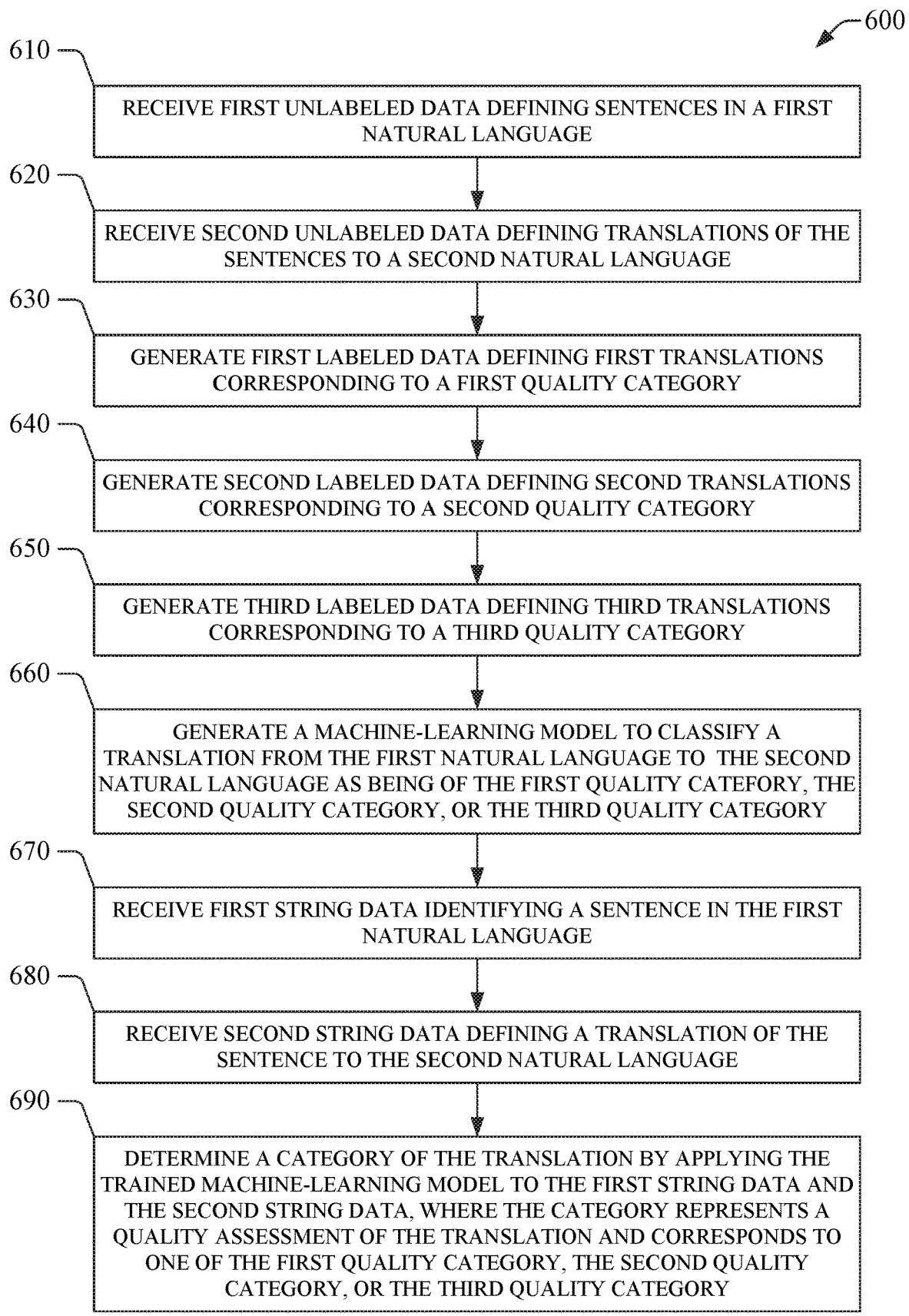
FIG. 6 illustrates an example of a method for evaluating performance of a trained machine-learning model to generate quality scores for brand curation, in accordance with one or more embodiments of this disclosure.

FIG. 6 illustrates an example of a method 600 for assessing the quality of a translation, in accordance with one or more embodiments of this disclosure. The example method 600 can be implemented, entirely or partially, by a computing system having various computing resources. The computing system has at least one processor and/or is functionally coupled to at least one processor that can implement (e.g., compile, execute, compile and execute, etc.) one or more blocks of the example method 600. The computing system also can include one or many memory devices, other types of computing resources, or a combination thereof. Such processor(s), memory device(s), and computing resource(s), individually or in a particular combination, can permit the computing system to implement the example method 500, entirely or partially. The computing resources can include operating system(s); software for configuration and/or control of a virtualized environment; firmware;

CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 500 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can include memory device(s) and/or other computing resources. Regardless of the example method 500 being implemented by a distributed or non-distributed computing system, the at least one processor can be functionally coupled to at least one memory device or other types of computer-readable non-transitory storage media.

At block 610, the computing system can receive first unlabeled data defining sentences in a first natural language (e.g., English). The sentences can constitute respective subtitles of video assets, in some embodiments.

At block 620, the computing system can receive second unlabeled data defining translations of respective sentences from the first natural language to a second natural language. The second natural language can be one of German, French, Spanish, Portuguese, or Italian, for example.

At block 630, the computing system can generate first labeled data defining first translations corresponding to a first quality type. At block 640, the computing system can generate second labeled data defining second translations corresponding to a second quality type. At block 650, the computing system can generate third labeled data defining third translations corresponding to a third quality type. For example, the first quality type can be Good Translation, the second quality type can be Loose Translation, and the third quality type can be Bad Translation. At each of blocks 630, 640, and 650, the labeled data can be generated in accordance with aspects described herein. In one embodiment, the computing system can include the data generator unit 120 that can generate the labeled data in each of the blocks 630, 640, and 650.

At block 660, the computing system can generate a machine-learning model to classify a translation from the first natural language to the second natural language. The computing system can use the first labeled data, the second labeled data, and the third labeled data to generate the machine-learning model. The machine learning model that is generated can be a hybrid assessor model for classification, as is described herein. Generating the machine-learning model can include supervised training of the classification model. At block 670, the computing system can receive first string data representative of a sentence in the first natural language. At block 680, the computing system can receive second string data representative of translation of the sentence to the second natural language.

At block 690, the computing system can determine a category of translation by applying the trained machine-learning model to the first string data and the second string data. The category represents a quality assessment of the translation and corresponds to one of Good Translation, Loose Translation, and Bad Translation.

In some embodiments, the machine-learning model that is generated at block 660 can be a hybrid assessor model for scoring, as is described herein. In such embodiments, instead of determining a category of the translation, the computing system can generate a score for the translation from the first natural language to the second natural language.

While not shown in FIG. 6, in some embodiments, the computing system can supply data identifying the category to a service device. The service device can utilize the data for quality control or other functions.

Figure 7:
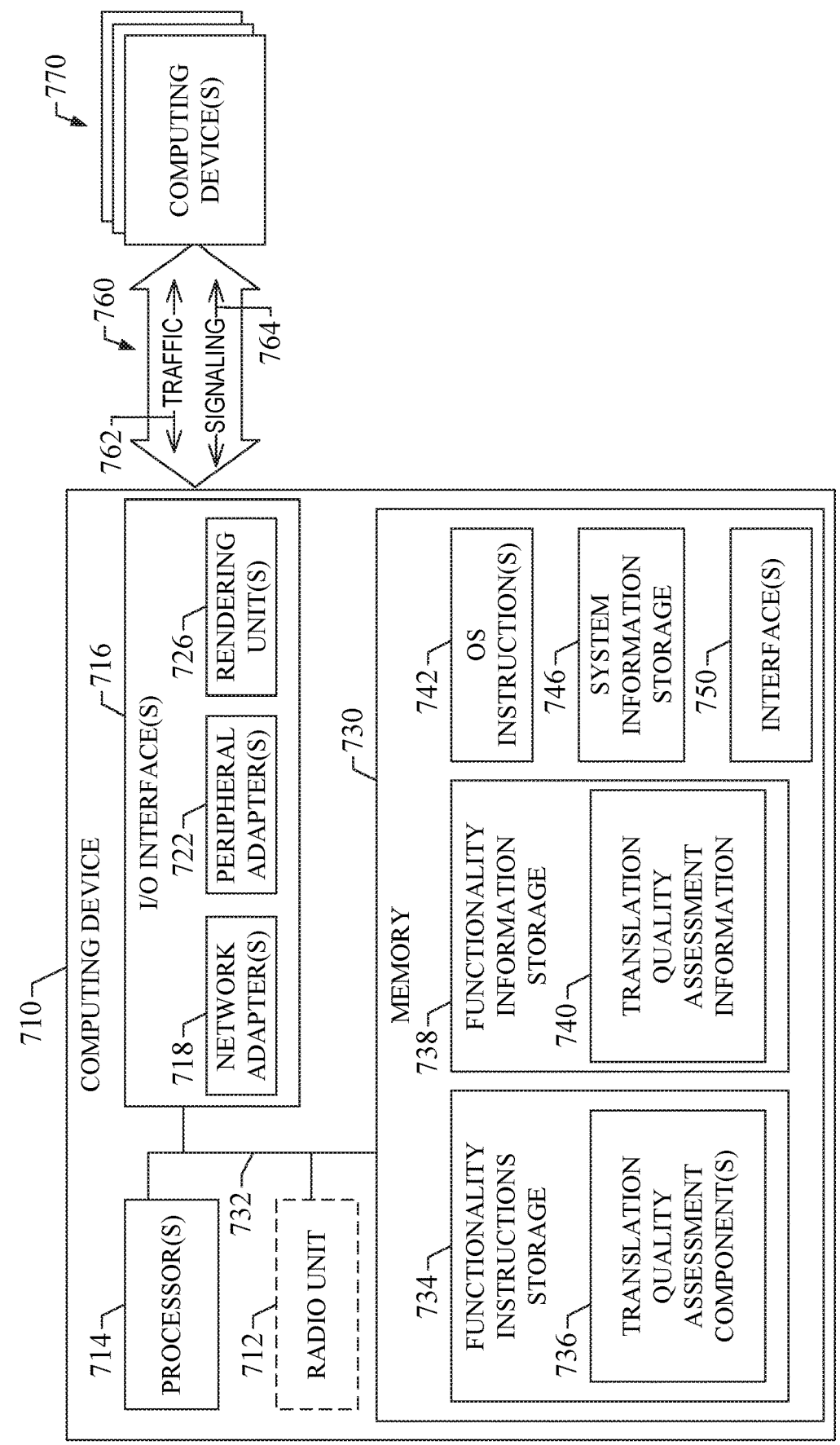
FIG. 7 illustrates an example of a computational environment for automated quality assessment of translations, in accordance with one or more embodiments of the disclosure.

FIG. 7 illustrates a block diagram of an example computational environment 700 for automated quality assessment of text translations, in accordance with one or more aspects of the disclosure. The example computational environment 700 is merely illustrative and is not intended to suggest or otherwise convey any limitation as to the scope of use or functionality of the computational environment's architecture. In addition, the illustrative computational environment depicted in FIG. 7 should not be interpreted as having any dependency or requirement relating to any one or combination of components illustrated in the example operational environments of the disclosure. The example computational environment 700 or portions thereof can embody, or can include, for example, one or more of the operational environment 100 or the computing system 400.

The computational environment 700 represents an example implementation of the various aspects or features of the disclosure in which the processing or execution of operations described in connection with the automated quality assessment of text translations disclosed herein can be performed in response to execution of one or more software components at the computing device 710. It should be appreciated that the one or more software components can render the computing device 710, or any other computing device that contains such components, a particular machine for automated quality assessment of text translations as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods disclosed herein, such as the example methods presented in FIG. 6.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the automated quality assessment of text translations described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 710 can comprise one or more processors 714, one or more input/output (I/O) interfaces 716, a memory 730, and a bus architecture 732 (also termed bus 732) that functionally couples various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can comprise one or more of network adapter(s) 718, peripheral adapter(s) 722, and rendering unit(s) 726. Such adapter(s) can permit or facilitate connectivity between the external device and one or more of the processor(s) 714 or the memory 730. For example, the peripheral adapter(s) 722 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 718 can functionally couple the computing device 710 to one or more computing devices 770 via one or more traffic and signaling pipes 760 that can permit or facilitate exchange of traffic 762 and signaling 764 between the computing device 710 and the one or more computing devices 770. Such network coupling provided at least in part by the at least one of the network adapter(s) 718 can be implemented in a wired environment, a wireless environment, or both. The information that is communicated by the at least one of the network adapter(s) 718 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 770 can have substantially the same architecture as the computing device 710. In addition or in the alternative, the rendering unit(s) 726 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 710, or can permit conveying or revealing the operational conditions of the computing device 710.

In one aspect, the bus 732 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system. In certain embodiments, such a distributed system can implement the functionality described herein in a client-host or client-server configuration in which the translation quality assessment component(s) 736 or the translation quality assessment information 740, or both, can be distributed between the computing device 710 and at least one of the computing device(s) 770, and the computing device 710 and at least one of the computing device(s) 770 can execute such components and/or leverage such information.

The computing device 710 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 710, and can comprise, for example, both volatile and non-volatile media, and removable and/or non-removable media. In one aspect, the memory 730 can comprise computer-readable media in the form of volatile memory, such as random access memory (RAM), and/or non-volatile memory, such as read-only memory (ROM).

The memory 730 can comprise functionality instructions storage 734 and functionality information storage 738. The functionality instructions storage 734 can comprise computer-accessible instructions that, in response to execution (by at least one of the processor(s) 714), can implement one or more of the functionalities of the disclosure. The computer-accessible instructions can embody or can comprise one or more software components illustrated as translation quality assessment component(s) 736. In one scenario, execution of at least one component of the translation quality assessment component(s) 736 can implement one or more of the methods described herein, such as the example method 600. For instance, such execution can cause a processor (e.g., one of the processor(s) 714) that executes the at least one component to carry out one or a combination of the disclosed example methods. It should be appreciated that, in one aspect, a processor of the processor(s) 714 that executes at least one of the translation quality assessment component(s) 736 can retrieve information from or retain information in one or more memory elements 740 in the functionality information storage 738 in order to operate in accordance with the functionality programmed or otherwise configured by the translation quality assessment component(s) 736. The one or more memory elements 740 may be referred to as translation quality assessment information 740. Such information can include at least one of code instructions, information structures, or the like.

In some embodiments, one or more components of the translation quality assessment component(s) 736 can embody, or can be part of, at least one of the data generator unit 120, the constructor unit 130, or the hybrid assessor unit 150. As such, in response to execution by at least one of the processor(s) 714, the one or more components can operate in accordance with, and can provide the functionality of, the data generate unit 120, the constructor unit 130, the assessor unit 150, or a combination thereof, in accordance with aspects described in this disclosure. In other embodiments, one or more of the translation quality assessment component(s) 736 in combination with at least one of the processor(s) 714 can embody, or can be part of, at least one of the data generator unit 120, the constructor unit 130 or the hybrid assessor unit 150, and can operate in accordance with, and can provide the functionality of, such units in accordance with aspects described in this disclosure.

At least one of the one or more interfaces 750 (e.g., application programming interface(s)) can permit or facilitate communication of information between two or more components within the functionality instructions storage 734. The information that is communicated by the at least one interface can result from implementation of one or more operations in a method of the disclosure. In certain embodiments, one or more of the functionality instructions storage 734 and the functionality information storage 738 can be embodied in or can comprise removable/non-removable, and/or volatile/non-volatile computer storage media.

At least a portion of at least one of translation quality assessment component(s) 736 or translation quality assessment information 740 can program or otherwise configure one or more of the processors 714 to operate at least in accordance with the functionality described herein. One or more of the processor(s) 714 can execute at least one of the translation quality assessment component(s) 736 and leverage at least a portion of the information in the functionality information storage 738 in order to provide automated quality assessment of text translations in accordance with one or more aspects described herein.

It should be appreciated that, in certain scenarios, the functionality instruction(s) storage 734 can embody or can comprise a computer-readable non-transitory storage medium having computer-accessible instructions that, in response to execution, cause at least one processor (e.g., one or more of the processor(s) 714) to perform a group of operations comprising the operations or blocks described in connection with the disclosed methods.

In addition, the memory 730 can comprise computer-accessible instructions and information (e.g., data, metadata, and/or programming code instructions) that permit or facilitate the operation and/or administration (e.g., upgrades, software installation, any other configuration, or the like) of the computing device 710. Accordingly, as illustrated, the memory 730 can comprise a memory element 742 (labeled operating system (OS) instruction(s) 742) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable OS. The memory 730 also comprises system information storage 746 having data, metadata, and/or programming code that permits or facilitates the operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the translation quality assessment component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and it can include one or more transformers to achieve a power level suitable for the operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or more remote computing devices 770. As an illustration, a remote computing device can be a personal computer, a portable computer, a server, a router, a network computer, a peer device or other common network node, and so on. As described herein, connections (physical and/or logical) between the computing device 710 and a computing device of the one or more remote computing devices 770 can be made via one or more traffic and signaling pipes 760, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device 710 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. The memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for automated quality assessment of text translations. It is, of course, not possible to describe every conceivable combination of elements and/or methods for purposes of describing the various features of this disclosure, but it can be recognized that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
   receiving, by a computing system comprising at least one processor, first unlabeled data defining video subtitles in a source natural language;
   receiving, by the computing system, second unlabeled data defining translations of the video subtitles to a target natural language;
   generating, by the computing system, using the first unlabeled data and the second unlabeled data, first labeled data defining first translations corresponding to a first quality category, wherein the first quality category includes satisfactory translations;
   generating, by the computing system, using the first unlabeled data and the second unlabeled data, second labeled data defining second translations corresponding to a second quality category, wherein the second quality category includes unacceptable translations subject to edition prior to being deemed satisfactory;
   generating, by the computing system, using the first unlabeled data and the second unlabeled data, third labeled data defining third translations corresponding to a third quality category; wherein the third quality category includes unsatisfactory translations;
   training, by the computing system, using the first labeled data, the second labeled data, and the third labeled data, a machine-learning model to classify a translation of a video subtitle in the source natural language to the target natural language as pertaining to the first quality category, the second quality category, or the third quality category;
   receiving, by the computing system, first string data defining a particular video subtitle in the source natural language;
   applying a first bidirectional long short-term memory (LSTM) encoder to the first string data;
   receiving, by the computing system, second string data defining a translation of the particular video subtitle to the target natural language;
   applying a second bidirectional (LSTM) encoder to the second string data; and
   determining, by the computing system, a category of the translation of the particular subtitle to the target natural language by applying a convolutional neural network to the concatenated output from the first LTSM encoder and the second LTSM encoder, the category representing a quality assessment of the translation and corresponding to one of the first quality category, the second quality category, or the third quality category.

2. The method of claim 1, wherein the source natural language is English and the target natural language is one of German, French, Spanish, Portuguese, and Italian.

3. The method of claim 1, wherein the generating the first labeled data comprises,
   training, using the first unlabeled data and the second unlabeled data, a statistical classifier to generate a score representing one of the first quality category, the second quality category, or the third quality category;
   generating a defined score for a source-target-language data pair by applying the statistical classifier, the source-target-language data pair having a first datum from the first unlabeled data and a second datum from the second unlabeled data;
   assigning, using the defined score, a label indicative of the first quality category to the target-target-language data pair.

4. The method of claim 3, wherein the generating the first labeled data further comprises,
   selecting a first video subtitle from the video subtitles in the source natural language; and
   generating a translation of the first video subtitle by applying a neural machine translation model to the first video subtitle; and
   assigning a second label indicative of the first quality category to the translation of the first video subtitle.

5. The method of claim 1, wherein the generating the second labeled data further comprises,
   selecting a translation of a second particular video subtitle, the translation of the second particular video subtitle being deemed satisfactory relative to a human curated translation, and at least one of:

modifying the translation of the second particular video subtitle by adding a subtitle-caption to the second particular video subtitle, or switching an ordering of a first defined word in the translation of the second particular video and a second defined word in the translation of the second particular video.

6. A method, comprising:

receiving, by a computing system comprising at least one processor, first unlabeled data defining text strings in a first natural language;

receiving, by the computing system, second unlabeled data defining translations of the text strings to a target natural language;

generating, by the computing system, using the first unlabeled data and the second unlabeled data, first labeled data defining first translations corresponding to a first quality category;

generating, by the computing system, using the first unlabeled data and the second unlabeled data, second labeled data defining second translations corresponding to a second quality category;

generating, by the computing system, using the first unlabeled data and the second unlabeled data, third labeled data defining third translations corresponding to a third quality category;

generating, by the computing system, using the first labeled data, the second labeled data, and the third labeled data, a machine-learning model to classify a translation of a text string in the first natural language to the target natural language as pertaining to the first quality category, the second quality category, or the third quality category;

receiving first string data defining a particular text string in the first natural language;

applying a first bidirectional long short-term memory (LSTM) encoder to the first string data;

receiving second string data defining a translation of the particular text string to the target natural language;

applying a second bidirectional (LSTM) encoder to the second string data; and determining a category of the translation of the particular text string to the target natural language by applying a convolutional neural network to the concatenated output from the first LTSM encoder and the second LTSM encoder, the category representing a quality assessment of the translation and corresponding to one of the first quality category, the second quality category, or the third quality category.

7. The method of claim 6, wherein one of the first quality category, the second quality category, or the third quality category includes paraphrased translations or translations subject to edition after being generated.

8. The method of claim 6, wherein the generating the first labeled data comprises, training, using the first unlabeled data and the second unlabeled data, a statistical classifier to generate a score representing one of the first quality category, the second quality category, or the third quality category;

generating a defined score for a source-target-language data pair by applying the statistical classifier, the source-target-language data pair having a first datum from the unlabeled data and a second datum from the second unlabeled data; and assigning, using the defined score, a label indicative of the first quality category to the source-target-language data pair.

9. The method of claim 6, wherein the generating the first labeled data further comprises, selecting a first video subtitle from the text strings in the first natural language; and generating a translation of the first text string by applying a neural machine translation model to the text string; and assigning a second label indicative of the first quality category to the translation of the first text string.

10. The method of claim 6, wherein the generating the second labeled data further comprises, selecting a translation of a particular text string, the translation deemed satisfactory relative to a human curated translation; and modifying the translation by applying a defined rule, the modified translation subject to edition prior to being deemed satisfactory.

11. A computing system, comprising:

at least one processor; and at least one memory device having computer-executable instructions stored thereon that, in response to execution by the at least one processor, cause the computing system to perform operation comprising:

receiving, by a computing system comprising at least one processor, first unlabeled data defining text strings in a first natural language;

receiving, by the computing system, second unlabeled data defining translations of the text strings to a target natural language;

generating, by the computing system, using the first unlabeled data and the second unlabeled data, first labeled data defining first translations corresponding to a first quality category;

generating, by the computing system, using the first unlabeled data and the second unlabeled data, second labeled data defining second translations corresponding to a second quality category;

generating, by the computing system, using the first unlabeled data and the second unlabeled data, third labeled data defining third translations corresponding to a third quality category;

generating, by the computing system, using the first labeled data, the second labeled data, and the third labeled data, a machine-learning model to classify a translation of a text string in the first natural language to the target natural language as pertaining to the first quality category, the second quality category, or the third quality category;

receiving first string data defining a particular text string in the first natural language;

applying a first bidirectional long short-term memory (LSTM) encoder to the first string data;

receiving second string data defining a translation of the particular text string to the target natural language;

applying a second bidirectional (LSTM) encoder to the second string data; and determining, by the computing system, a category of the translation of the particular text string to the target natural language by applying a convolutional neural network to the concatenated output from the first LTSM encoder and the second LTSM encoder, the category representing a quality assessment of the translation and corresponding to one of the first quality category, the second quality category, or the third quality category.

12. The computing system of claim 11, wherein one of the first quality category, the second quality category, or the third quality category includes paraphrased translations or translations subject to edition after being generated.

13. The computing system of claim 11, wherein the generating the first labeled data comprises,
- training, using the first unlabeled data and the second unlabeled data, a statistical classifier to generate a score representing one of the first quality category, the second quality category, or the third quality category;
- generating a defined score for a source-target-language data pair by applying the statistical classifier, the source-target-language data pair having a first datum from the unlabeled data and a second datum from the second unlabeled data; and
- assigning, using the defined score, a label indicative of the first quality category to the source-target-language data pair.

14. The computing system of claim 13, wherein the generating the first labeled data further comprises,
- selecting a first video subtitle from the text strings in the first natural language; and
- generating a translation of the first text string by applying a neural machine translation model to the text string; and
- assigning a second label indicative of the first quality category to the translation of the first text string.

15. The computing system of claim 11, wherein the generating the second labeled data further comprises,
- selecting a translation of a particular text string, the translation deemed satisfactory relative to a human curated translation; and
- modifying the translation by applying a defined rule, the modified translation subject to edition prior to being deemed satisfactory.

16. The computing system of claim 15, wherein the defined rule dictates to add a subtitle-caption to the translation of the particular text string.

* * * * *